United States Patent

Claret

[15] 3,657,637

[45] Apr. 18, 1972

[54] APPARATUS FOR MEASURING THE ATTITUDE OF A BOREHOLE

[72] Inventor: Rene Claret, Sceaux, France

[73] Assignee: Societe D'Applications Generales D'Electricite Et De Mecanique Sagem, Paris, France

[22] Filed: June 15, 1970

[21] Appl. No.: 45,966

[30] Foreign Application Priority Data

June 19, 1969 France..................................6920513

[52] U.S. Cl..................................................324/8, 33/205
[51] Int. Cl....................................G01v 3/00, E21b 47/022
[58] Field of Search..................................324/8, 10; 33/205

[56] References Cited

UNITED STATES PATENTS 3,068,400   12/1962   Castel et al. ..............................324/10
3,077,670   2/1963   Waters..................................324/10 X
3,100,350   8/1963   Brown..................................324/10 X Primary Examiner—Gerard R. Strecker
Attorney—Larson, Taylor and Hinds

[57] ABSTRACT

The measuring apparatus includes a hollow shaft coaxial with the drilling line, a pendulum device, a driving motor, driving through a central spindle and gears, a rotary device, sensitive to the earth magnetic field and mounted pivotably around a vertical rod of the pendulum device. Rotary and fixed detecting members produce signals indicating the inclination with respect to the vertical and the azimuth with respect to magnetic north of the drilling line. One detector means may comprise a ball or roller of electrically conducting material, moving over two rails in the form of a loop. One rail is of electrically conducting material and the other is partly of electrically conducting material and partly of insulating material. The two rails are at different potentials.

10 Claims, 5 Drawing Figures

PATENTED APR 18 1972

APPARATUS FOR MEASURING THE ATTITUDE OF A BOREHOLE

The present invention relates to measuring apparatus for locating position, especially the inclination with respect to the vertical and the azimuth with respect to a horizontal reference direction, of a geological drilling line.

Known measuring apparatus call upon optical devices and are capable, especially, of measuring angular deviations between the axis of a drilling line and the vertical, but the application of these apparatus is generally limited to the measurement of deviations less than 10 or 15° since it has appeared impossible, for reasons of bulk, precision and of mechanical conception, to extend their field of measurement.

Certain of these apparatus also indicate the azimuth in which the drilling line occurs in the case of deviation with respect to the vertical.

Now, in the drilling techniques which have now been developed and, especially in the case of bores effected from platforms in the continental plateau, it is now conventional to effect bores in "umbrella", i.e. bores effected in various azimuths from a same derrick and with inclinations with respect to the vertical which can reach 60° and even more.

There were then proposed measuring apparatus the mechanical type, but the precision of such apparatus has not been sufficient in the range of measurements required by the users, which extends in practice, as regards the angular deviation between the axis of the drilling line and the vertical, from 0° to values in the neighbourhood of 90°.

It is a particular object of the invention to provide a measuring apparatus for locating the inclination with respect to the vertical and the azimuth with respect to a horizontal reference direction of a geological drilling line of which the inclination is comprised between a value nil with respect to the vertical and a value which can reach 90°.

The invention relates to a measuring apparatus in which the measurement of the inclination and of the azimuth is obtained by a rotary kinematic series (i.e. an assembly of rotating elements) driven by a motor and supplying successively, due to suitable detector means, an electrical pulse on the passage of an element sensitive to the reference direction (vertical direction or horizontal direction connected with the terrestrial magnetic field), and an electrical pulse on the passage of a sensing element in the direction of the axis of the drilling line.

It will then be seen that the angle to be measured (inclination or azimuth) is represented by the angular amplitude of the movement of the kinematic series separating the angular positions of this kinematic series which correspond to successive electrical pulses.

In particular, when the kinematic series turns at constant speed, this angular amplitude can be identified by the measurement of the interval of time separating the moments of appearance of two successive pulses.

The measurement of inclination and of azimuth by this kinematic series lends itself particularly well to recording and/or to transmission of the required measurements.

The measuring apparatus according to the invention is characterized by the fact that it comprises, a. a rotary kinematic series constituted principally by:

a pivoting part held coaxially with the axis XX of the drilling line by bearings and freely rotatable in the said bearings, this pivoting part being rigidly fixed to a yoke defining an axis ZZ perpendicular or at right-angles to the axis XX, a swinging device comprising a weight borne by a vertical rod fixed perpendicularly on a horizontal rod rotatable coaxially with the axis ZZ in bearings borne by the yoke, and a driving motor rotating a motor shaft of which one of the ends, terminates at the level of the yoke and bears a drive pinion in mesh with an intermediate pinion mounted freely on the horizontal rod, the fixed part of this drive motor being borne by the pivoting part, b. and detector means constituted principally by : first detector means comprising a rotating sensing element rotated by the motor shaft and arranged so that a first electrical pulse is delivered when this rotary sensing element passes to the vertical from its axis of rotation, second detector means comprising a rotating sensing element rotated by the motor shaft and passing in front of a fixed sensing element situated in a direction connected with the direction of the axis XX of the drilling line, these rotating and fixed sensing elements being arranged so that a second electrical pulse is delivered when the rotating sensing element passes in front of the fixed sensing element, third detector means comprising a rotating device sensitive to the terrestrial magnetic field so as to deliver a third electrical pulse when its sensing axis YY coincides with the axis of the terrestrial magnetic field, this rotating device being mounted coaxially with the vertical rod and rotated by the driving motor through a receiver pinion itself driven by the intermediate pinion, and fourth detector means comprising a rotating sensing element rotated by the rotating device and passing in front of a fixed sensing element situated in a direction connected with the projection, in a horizontal plane, of the axis XX of the drilling line, these rotating and fixed sensing elements being arranged so that a fourth electrical pulse is delivered when the rotating sensing element passes in front of the fixed sensing element.

The angular amplitude of the movement of the motor shaft between the first and second electrical pulses is representative of the inclination of the axis XX of the drilling line with respect to the vertical.

The angular amplitude of the movement of the motor shaft between the third and fourth electrical pulses is representative of the azimuth of the axis XX of the drilling line with respect to the horizontal direction of magnetic north.

In order that the invention may be more fully understood, several embodiments of the measuring apparatus according to the invention are described below, purely by way of illustrative but non-limiting example, with reference to the accompanying drawing in which.

Figure 1:
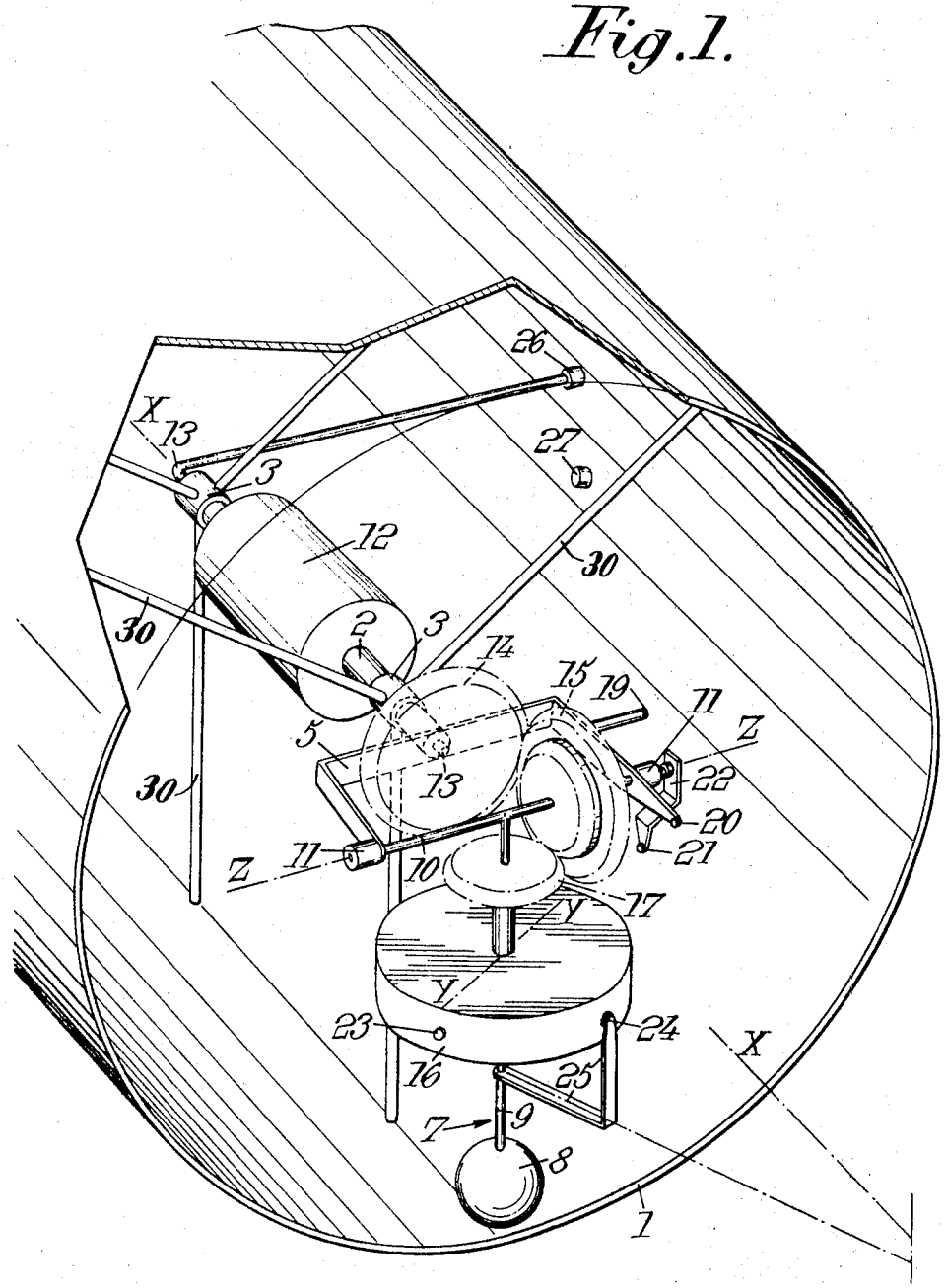
FIG. 1, is a diagrammatic view in perspective illustrating the principle of a measuring apparatus according to the invention.
Figure 2:
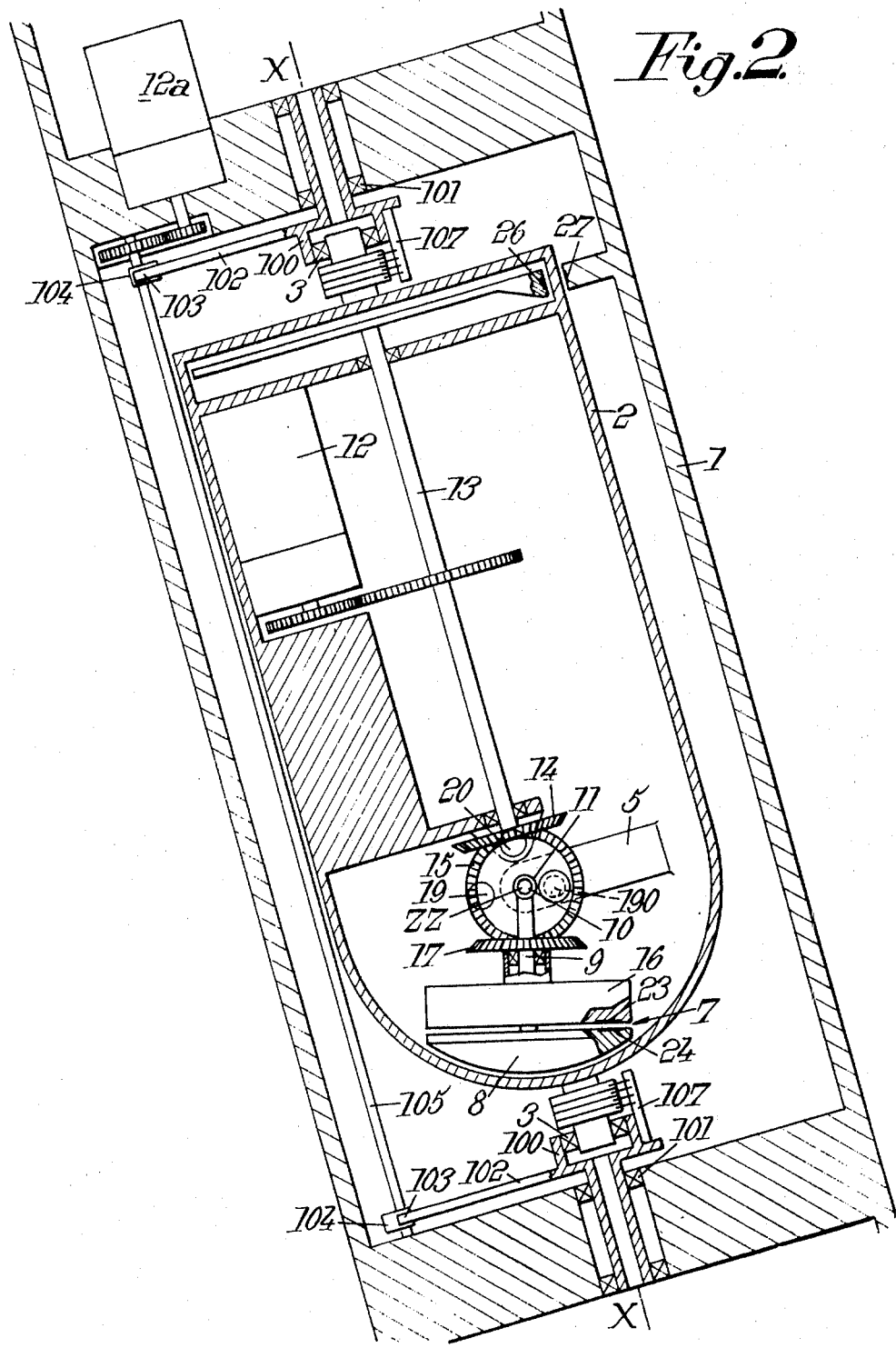
FIG. 2 is a section in more detail through a longitudinal vertical plane of an embodiment of a measuring apparatus constructed according to the invention.

As shown in FIGS. 1 and 2, the measuring apparatus is mounted inside a tubular section constituted by one of the sections of the drilling line 1 by arms 30 and situated relatively near the drilling head (not shown).

This apparatus comprises, a pivoting part 2 held coaxially with the axis XX of the drilling line by two bearings 3, in which the said pivoting part 2 can pivot freely, this pivoting part 2 being rigidly fixed to a yoke 5 defining an axis ZZ perpendicular to the axis XX of the drilling line 1, and a pendulum device, denoted in a general way by the reference FIG. 7, which comprises a weight 8 borne by a vertical rod 9 fixed perpendicularly on a horizontal rod 10 which can turn coaxially with the axis ZZ in two bearings 11 borne by the yoke 5.

A driving motor 12, constituted advantageously by an electrical motor, rotates a drive shaft 13 of which one of the ends terminates at the level of the yoke 5 and bears a motor pinion 14 in mesh with an intermediate pinion 15 mounted freely on the horizontal rod 10, the stator of this motor 12 being borne by the pivoting part 2.

Due to this arrangement, the measurement of inclination is not affected by the angular position not by a residual angular velocity of the pivoting part 2 around its bearings 3, in particular when the axis XX of the drilling line 1 is vertical or close to the vertical.

Figure 3:
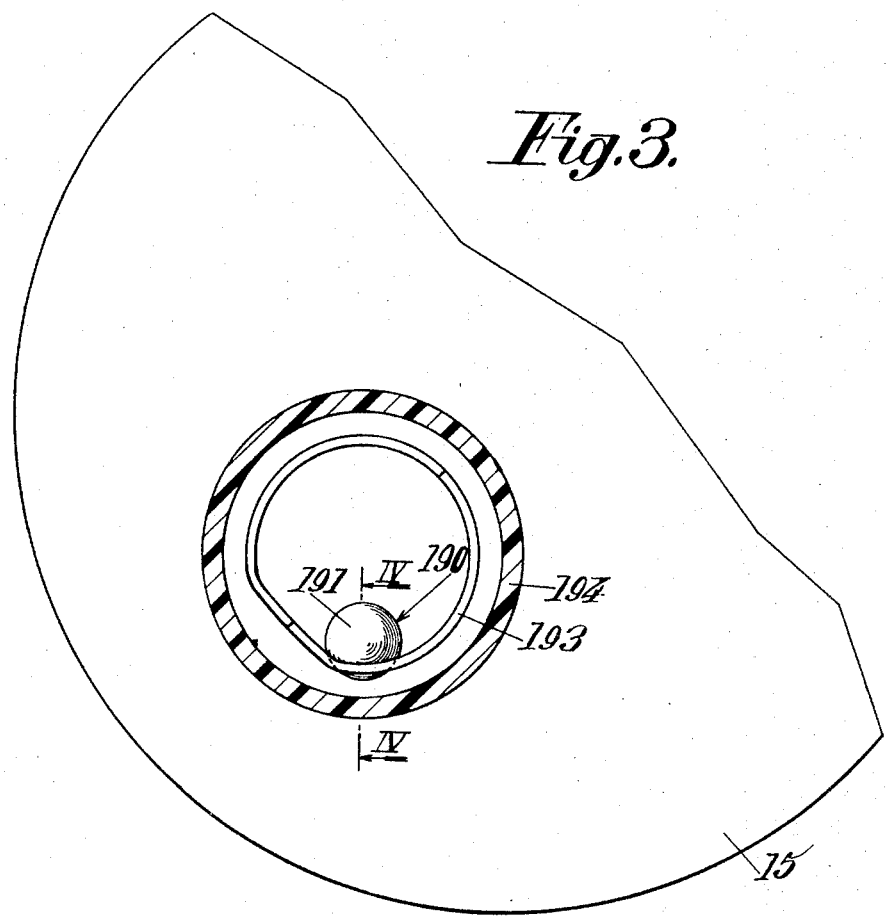
FIG. 3 shows the constitution of detector means of position relative to the vertical in the embodiment of the apparatus according to the invention illustrated in FIG. 2.
Figure 4:
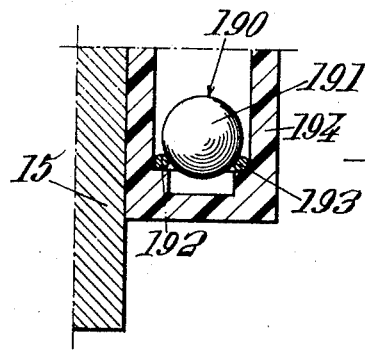
FIG. 4 is a cross-section along the line IV—IV of FIG. 3.

Various detector means to measure the inclination of the axis XX of the drilling line 1 with respect to the vertical and for measuring the azimuth of the axis XX of the drilling line 1 with respect to the horizontal direction of magnetic north are then provided and are constituted by:

first detector means comprising a rotating sensing element 19, 190 rotated by the motor shaft 13 and arranged so that a first electrical pulse is delivered when this rotating sensing element 19, 190 passes to the vertical from its axis of rotation, that is to say in front of a fixed sensing element supported on an arm 22, second detector means comprising the rotating sensing element 19 rotated by the motor shaft 13 and passing in front of a fixed sensing element 20 situated in a direction connected with the direction of the axis XX of the drilling line 1, these rotating sensing elements 19 and fixed 20 being arranged so that a second electrical pulse is delivered when the rotating sensing element 19 passes in front of the fixed sensing element 20, third detector means comprising a rotating device 16 sensitive to the terrestrial magnetic field so as to deliver a third electrical pulse when its sensing axis YY coincides with the axis of the terrestrial magnetic field, this rotating device 16 being mounted coaxially with the vertical rod 9 and rotated by the driving motor 12 through the receiver pinion 17 itself driven by the intermediate pinion 15, and fourth detector means comprising a rotating sensing element 23 rotated by the rotating device 16 and passing in front of a fixed sensing element 24 situated in a direction 25 connected with the projection, in a horizontal plane, of the axis XX of the drilling line 1, these rotating sensing elements 23 and fixed 24 being arranged so that a fourth electrical pulse is delivered when the rotating sensing element 23 passes in front of the fixed sensing element 24. In the embodiment of FIG. 2, the first detector means comprises a sensing element 190 which is also arranged to deliver a first electrical pulse when it passes to the vertical from its axis, that is to say (as shown in FIGS. 3 and 4) when the ball or roller 191 passes the separation of the mixed rail 193 (separation between conducting and insulating parts of the mixed rail 193).

The sensing element 190 is fixed, in an eccentric position, on the intermediate pinion 15.

It is then envisaged that the angular amplitude of the movement of the motor shaft 13 between the first and second electrical pulses is representative of the inclination of the axis XX of the drilling line 1 with respect to the vertical; if the motor shaft 13 turns at a constant speed, this angular amplitude can be identified by the measurement of the interval of time which separates the first and second electrical pulses.

In the same way, the angular amplitude of the movement of the motor shaft 13 between the third and fourth electrical pulses is representative of the azimuth of the axis XX of the drilling line with respect to the horizontal direction of magnetic north; if the drive shaft 13 turns at a constant speed, this angular amplitude can be identified by the measurement of the interval of time which separates the third and fourth electrical pulses.

Preferably, fifth detector means are yet provided to obtain a representative indication of the angular position of the drive shaft 13 with respect to the drilling line 1.

This fifth detector means comprises a rotating sensing element 26 rotated by the motor shaft 13 and passing in front of a fixed sensing element 27 rigidly fixed to the drilling line 1, these rotating sensing elements 26 and fixed 27 being arranged, so that a fifth electrical pulse is delivered when the rotating sensing element 26 passes in front of the fixed sensing element 27.

This fifth electrical pulse is therefore well representative of the angular position of the drive shaft 13 with respect to the drilling line 1.

It is advantageous, as shown in FIG. 2, to give the pivoting part 2 the shape of a closed box shielding the pendulum device 7, the electrical driving motor 12, the first, second, third and fourth detector means, this pivoting part 2 being then constituted by a nonmagnetic material such as titanium.

Under these conditions, the fifth detector means comprise a rotating sensing element 26 arranged inside the pivoting part 2 and a fixed sensing element 27 arranged outside the pivoting part 2.

When the apparatus is intended to measure an inclination between the vertical and the axis XX of the drilling line 1 of which the value is limited to a maximal value, less by several degrees, than 90°, the two motor pinions 14 and receiver 17 have the same diameter and mesh on a simple intermediate pinion 15 (FIG. 2).

If the apparatus is intended to measure an inclination between the vertical and the axis XX of the drilling line 1 of which the maximal value can reach 90°, the two drive 14 and take-up 17 pinions have different diameters and enmesh on an intermediate double pinion 15 (FIG. 1).

In the embodiment shown in FIG. 1, the first detector means comprises a rotating sensing element 19 rotated by the drive shaft 13 and passing in front of a fixed sensing element 21 situated in a direction connected with the direction of the vertical. The fixed sensing element 21 is supported by an arm 22 rotatably fixed to the horizontal rod 10. The fixed sensing element 21 is supported by an arm which is in a constant angular relationship with respect to the axis XX of the drilling line.

The fixed sensing element 24 is supported by an arm which is fixed on the vertical rod 9.

The fixed sensing element 24 is supported by the weight 8 itself.

The yoke 5 is supported by the pivoting part 2.

The motor shaft 13 rotates the pinion 14 which rotates the pinion 15 supporting the rotating sensing element 19.

The rotating device 16 which supports the rotating sensing element 23 rotates around the vertical rod 9; the rotating device 16 is driven by the pinion 17 which is driven by a pinion coupled with the pinion 15; said pinion 15 is driven by the pinion 14, itself driven by the shaft 13.

These rotating 19 and fixed 21 sensing elements are arranged so that the first electrical pulse is delivered when the rotating sensing element 19 passes in front of the fixed sensing element 21. In the embodiment of FIG. 1, the first and second detector means deliver two electrical pulses and the angular amplitude of the movement of the motor shaft 13 between these two electrical pulses is representative of the inclination of the axis XX of the drilling line 1 with respect to the vertical.

The third and fourth detector means deliver two electrical pulses and the angular amplitude of the movement of the motor shaft 13 between these two electrical pulses is representative of the azimuth of the axis XX of the drilling line with respect to the horizontal direction of the magnetic north.

In FIG. 2, the second and fourth detector means are the same as in FIG. 1.

The fifth detector means delivers a fifth electrical pulse. The angular amplitude of the movement of the motor shaft 13 between this fifth electrical pulse and the fourth electrical pulse delivered by the rotating sensing element 23 is representative of the position of the fixed sensing element 27 with respect to the horizontal direction of magnetic north.

As indicated above, the element 22 is an arm, that is to say a vertical arm, which supports the fixed sensing element 21.

In the embodiment shown in FIGS. 2 to 4, the first detector means comprises a movable sensing element 190 constituted by a ball or a roller 191, of an electrically conducting material, displaced over two rails 192 and 193 in the form of a loop which are rotated around a horizontal axis by the drive shaft 13. One of these two rails, the rail 192, is of an electrically conducting material, and the other, the mixed rail 193, is in part of an electrically conducting material, in part of an insulating material, means being provided so that these two rails 192 and 193 are at different electrical potentials. In this way, when one of the two separations between the two portions of mixed rail 193 passes to the vertical from the axis of rotation of the group of two rails 192 and 193, the ball or roller 191 modifies the electrical connection between the two abovesaid rails, which releases the first electrical pulse.

Advantageously, the portion of the two rails 192 and 193 surrounding the useful separation of the mixed rail 193 has a circular shape of large radius, whilst the remaining portion of the two rails 192 and 193 has any shape, preferably continuous.

Due to this constitution of the first detector means, the precision of the apparatus is increased when the separation between the vertical and the axis XX of the drilling line is slight (comprised between 0° and several degrees).

In fact, the modification of the electrical connection obtained between the two rails 192 and 193 is manifested by a change of state with a sharp wave front and perfectly located, relative to the two respective potentials of the two said rails.

The two rails 192 and 193 can be shielded in a case 194, constituted of an insulating material, this case 194 being fixable on the intermediate pinion 15.

As regards the rotating device 16 constituting the third detector means, it can be constructed according to one of the embodiments of the detector device for a magnetic field protected in French patent application No. PV 69 26548 of 1 Aug., 1969, filed in the name of the present assignee and due to the invention of Monsieur Henri Berger.

Figure 5:
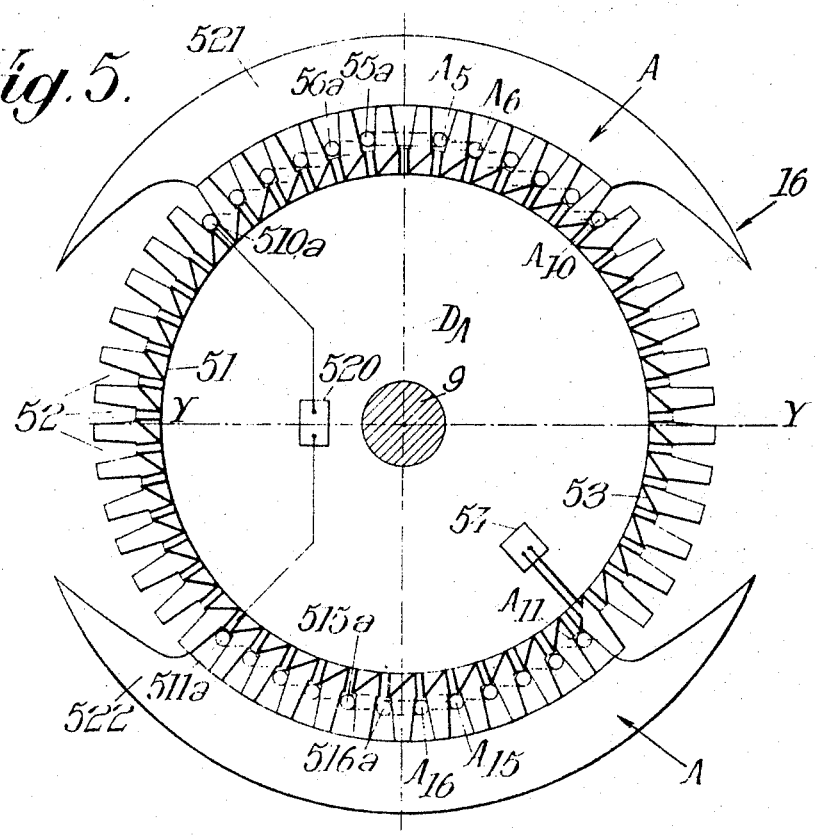
FIG. 5 shows the constitution of detector means of position relative to the horizontal direction of the magnetic north in the embodiment illustrated in FIG. 2.

In this embodiment and as shown in FIG. 5, the rotating device 16 includes, a toric core 51 rotating around the vertical axis 9 and constituted of a material having magnetic permeability properties and including a plurality of slots 52, identical and regularly distributed over the circumference of the said toric core 51, these slots being able to be open outwardly (as shown in FIG. 5), or towards the interior, and an energizing coil 53 constituted by a winding around the toric core 51, this winding passing through the bottom of each of the said slots 52 and being constructed so that the solenoid thus obtained is regular and closed, each slot carrying at least one turn of the said energizing coil 53 (two turns in the case illustrated in FIG. 5).

This toric core 51 can advantageously be constituted by a package of sheets bonded one on the other, the constituent material of the abovesaid sheets having a high magnetic permeability.

The energizing coil 53 is supplied at 54 by an alternating voltage of any frequency, which can be a sine-wave voltage, and whose amplitude is such that on each half alternation the saturation of the toric core 51 is effected.

The detector device is preferably of the single phase type, which is the case of with the embodiment of the device illustrated in FIG. 5, and comprises a single group A of detector coils 55a, 56a ... 510a ... 511a, 515a, 516a, this group A being constituted by windings of toric shape, flattened or circular, of which the respective middle planes $A_5, A_6 ... A_{10}, A_{11} ... A_{15}, A_{16}$ are parallel between themselves and perpendicular to the middle plane of the toric core 51, each winding constituting a detector coil passing through a pair of slots 52 arranged symmetrically with respect to the diametric axis of symmetry $D_A$ of the toric core 51, perpendicular to the middle planes $A_5 ... A_{16}$ of the abovesaid toric winding.

The detector coils 55a ... 516a of the group A are connected in series from the electrical point of view.

At 520 is collected the voltage induced at the terminals of the detector coils 55a ... 516a of the group A (coils connected in series), the third electrical pulse being released when this voltage has a minimal value and change of phase. The angular position of the toric core 51 is at this moment such that its diametric axis of symmetry $D_A$ is perpendicular to the direction of the magnetic field; this induced voltage having a frequency double the supply voltage of the energizing coil 53. The sensing axis YY of this rotating device 16 is then perpendicular to the diametric axis of symmetry $D_A$.

Preferably, a detector coils 55a ... 516s are distributed in two series each involving the two series of slots 52 close to the diametric axis of symmetry $D_A$.

It is advantageous to include with the toric core 51 thus constituted and wind two polar parts 521 and 522 constituted of a material having a high magnetic permeability, these polar parts 521 and 522 being arranged symmetrically with respect to the abovesaid axis $D_A$.

The presence of the slots, the distribution of the detector coils as indicated above and the possible mounting of two polar parts, enables the induced voltage, in the said detector coils, by the variation of the flux of the magnetic field to be distinctly greater than for any other known rotating device sensitive to the magnetic field, which enables therefore further improvement of the precision of the apparatus.

In a preferred embodiment according to the invention, illustrated in FIG. 2, the bearings 3 maintaining the pivoting part 2, are moved by mechanical means from an auxiliary electrical motor 12a.

Advantageously, these mechanical activating means also move the rotating contacts 107 effecting the electrical connections of the elements borne by the pivoting part 2.

In the embodiments shown in FIG. 2, each bearing 3 is constituted by a rotating portion rigidly fixed to the pivoting part 2 and a non-rotating portion rigidly fixed to an oscillating part 100.

This oscillating part 100 is mounted on conventional bearings 101 and it is provided with an arm 102 bearing at its end a fork 103 in which a cam 104 turns borne by a control shaft 105 rotated by the auxiliary electrical motor 12a.

Advantageously, the two cams 104, respectively relative to the two oscillating arms 102, are identical but displaced by 180° so as to create an activation in opposite phase for each of the two bearings 3.

In addition, each oscillating part 100 supports the rubbing members of the rotating contacts 107.

From the constructional point of view, it is advantageous to arrange the control shaft 105 in the neighbourhood of the inner wall of the tubular section of the drilling line 1. From the different electrical pulses, it is possible to form, by means not shown, a certain number of signals, such as electrical signals emitted at a fixed frequency and of which the number corresponds to the angular displacement of which the number corresponds to the angular displacement of the drive shaft 13:

between the first and second electrical pulses (the number of signals then representing the inclination with respect to the vertical), between the third and fourth electrical pulses (the number of signals then representing the azimuth), and between the fourth and fifth electrical pulses (the number of signals then representing the position of the reference generator of the drilling line passing through the fixed element 27 with respect to the magnetic meridian).

These electrical signals can be transmitted to the surface of the earth by various means which do not form part of the invention and which are well-known (transmission by electrical means or transmission by acoustic means).

Whatever the embodiment of the apparatus, it is preferable to enclose the assembly of the elements which constitute it in sealed manner in a tubular section of the drilling line 1, or in an intermediate container, the assembly of elements dipping into an oil ensuring lubrication, the damping of the elements which are in motion, and the balancing of the pressures.

Finally, there is provided an apparatus which has a certain number of advantages, among which may be cited those summarized by the following points:

precision independent of the value of the inclination of the axis of the drilling line with respect to the vertical; in this respect, it may indicated that precisions of ± 15 feet have been obtained for inclinations which can vary from 0° to 90°, the azimuth, variable over 360°, being measured with a precision of ± 2° for inclinations greater than 5°, this precision varying progressively for inclinations less than 5°, the azimuth losing any significance for a nil inclination, i.e. when the drilling line is vertical:

simplicity of operation and great reliability, which is particularly important in view of the very severe conditions to which the apparatus is subjected, especially during the drilling periods (very high accelerations or angular decelerations), this reliability resulting especially from the angular uncoupling of the kinematic series with respect to the drilling line;

possibility of annulling all the causes of inaccuracies due to friction and to reactive couplings;

influence of residual separations of inclination of the vertical rod, which would be due to a fault of mobility of the pivoting part, limited to an influence of the second order on indications relating to the azimuth;

constant definition of inclination for all values comprised between 0° and 90°.

I claim:

1. Measuring apparatus for locating position, especially the inclination with respect to the vertical and the azimuth with respect to a horizontal reference direction, of a geological drilling line, said apparatus comprising,
   a. a rotary kinematic series constituted principally by:
      a pivoting part held coaxially with the axis XX of the drilling line by bearings and capable of pivoting freely in said bearings, a yoke defining an axis ZZ perpendicular to the axis XX, to which yoke said pivoting part is rigidly fixed,
      a pendulum device comprising a weight borne by a vertical rod fixed perpendicularly to a horizontal rod rotatable coaxially with the axis ZZ in bearings borne by the yoke,
      and a motor rotating a drive-shaft of which one end terminates at the level of the yoke and bears a drive pinion in mesh with an intermediate pinion mounted freely on the horizontal rod, the fixed portion of said motor being borne by the pivoting part, and
   b. detector means constituted principally by:
      first detector means comprising a rotary sensing element rotatably supported through pinions by the motor shaft and arranged so that a first electrical pulse is delivered to a receiver when this rotary sensing element passes to the vertical from its axis of rotation,
      second detector means comprising a rotary sensing element rotatably supported through arms by the motor shaft and passing before a fixed sensing element situated in a direction connected to the direction of the axis XX of the drilling line, said rotary sensing elements and fixed sensing elements being arranged so that a second electrical pulse is delivered to said receiver when the rotary sensing element passes before the fixed sensing element,
      third detector means comprising a rotary device sensitive to the terrestrial magnetic field so as to deliver a third electrical pulse when its sensing axis YY coincides with the axis of the terrestrial magnetic field, said rotary device being mounted through bearings coaxially with a vertical rod and rotated by the driving motor through a receiver pinion itself driven by the intermediate pinion,
      and fourth detector means comprising a rotary sensing element rotatably supported through arms by the rotary device and passing before a fixed sensing element situated in a direction connected with the extension, in a horizontal plane, of the axis XX of the drilling line, said rotary and fixed sensing elements being arranged so that a fourth electrical pulse is delivered to said receiver when the rotary sensing element passes before the fixed sensing element,
   the angular amplitude of the movement of the motor shaft between the first and the second electrical pulses being representative of the inclination of the axis XX of the drilling line with respect to the vertical, while the angular amplitude of the movement of the drive shaft between the third and fourth electrical pulses is representative of the azimuth of the axis XX of the drilling line with respect to the horizontal direction of magnetic north.

2. Apparatus according to claim 1, including fifth detector means comprising a rotary sensing element rotated by the drive shaft and passing before a fixed sensing element rigidly fixed to the drilling line, said rotary and fixed sensing elements being arranged so that a fifth electrical pulse is delivered when the rotary sensing element passes before the fixed sensing element, said fifth electrical pulse being representative of the angular position of the drive shaft with respect to the drilling line.

3. Apparatus according to claim 1, for measuring an inclination between the vertical and the axis XX of the drilling line of which the value is limited to a maximal value less than 90° by at least several degrees, wherein the two driving and driven pinions have the same diameter and engage on a single intermediate pinion.

4. Apparatus according to claim 1, for measuring an inclination between the vertical and the axis XX of the drilling line whose maximal value can reach 90°, wherein the two driving and driven pinions have different diameters and engage on a double intermediate pinion.

5. Apparatus according to claim 1, wherein the first detector means comprise a rotary sensing element rotated by the drive shaft and passing before a fixed sensing element situated in a direction connected with the vertical, said rotary and fixed sensing elements being arranged so that the first electrical pulse is delivered when the rotary sensing element passes before the fixed sensing element.

6. Apparatus according to claim 1, wherein the first detector means comprise a movable sensing element constituted by a ball or a roller of an electrically conducting material, moving over two rails in the form of a loop which are rotated around a horizontal axis by the drive shaft, one of said two rails being of an electrically conducting material, while the other rail is partially of electrically conducting material, partially of insulating material, means being provided so that said two rails are at different electrical potentials, so that, when one of the two separations between the two parts of the mixed rail passes to the vertical from the axis of rotation of the assembly of the two rails, the ball or roller modifies the electrical connection between the two said rails, so releasing the first electrical pulse.

7. Apparatus according to claim 1, wherein the sensing element of the second detector means comprises,
   a toric core rotating around the vertical axis and constituted of a material having magnetic permeability properties and comprising a plurality of slots identical and regularly distributed over the circumference of said toric core,
   an energizing coil constituted by a winding around the toric core, said winding passing through the bottom of each of said slots and being constructed in such manner that the solenoid thus obtained is regular and closed, each slot shielding at least one turn of said energizing coil, said energizing coil being fed by an alternating voltage of which the amplitude is such that at each half-oscillation the saturation of said toric core is obtained.
   and a group of detector coils, said group being constituted by windings of toric shape of which the respective middle planes are parallel between themselves and perpendicular to the middle plane of the toric core, each winding constituting a detector coil passing through a pair of slots arranged symmetrically with respect to the diametric axis of symmetry of the toric core which is perpendicular to the middle plane of said toric windings,
   the third electrical pulse being released when the voltage induced at the terminals of the detector coils, connected in series, has a minimal value and changes phase, the axis of symmetry YY of its rotary device being perpendicular to its diametric axis of symmetry.

8. Apparatus according to claim 1, wherein the bearings holding the pivoting part are kept in alternating angular movement by mechanical means.

9. Apparatus according to claim 1, wherein the pivoting part forms a closed box shielding the pendulum device, the driving motor, the first, second, third and fourth detector means, said pivoting part being constituted of a non-magnetic material.

10. Apparatus according to claim 1, wherein the assembly of the elements constituting it are enclosed in sealed manner in a tubular section incorporated in the drilling line and dipping into an oil ensuring lubrication, damping of the moving elements and balancing of the pressures.

* * * * *